United States Patent
Hashimoto et al.

(10) Patent No.: US 7,017,530 B2
(45) Date of Patent: Mar. 28, 2006

(54) METHOD FOR CONTROLLING COMPRESSION IGNITION INTERNAL COMBUSTION ENGINE

(75) Inventors: Kohtaro Hashimoto, Wako (JP); Takahiro Gunji, Wako (JP); Kohjiroh Aimoto, Wako (JP); Ryogo Sakamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/875,181

(22) Filed: Jun. 25, 2004

(65) Prior Publication Data

US 2004/0261763 A1 Dec. 30, 2004

(30) Foreign Application Priority Data

| Jun. 27, 2003 | (JP) | ............................. 2003-184709 |
| Dec. 4, 2003 | (JP) | ............................. 2003-405678 |
| Mar. 12, 2004 | (JP) | ............................. 2004-070196 |
| Apr. 6, 2004 | (JP) | ............................. 2004-112017 |

(51) Int. Cl.
  *F02M 43/00* (2006.01)
  *F02D 19/00* (2006.01)
  *F02B 1/12* (2006.01)

(52) U.S. Cl. ...................................... 123/1 A; 123/304

(58) Field of Classification Search ................ 123/1 A, 123/304; 44/322, 326, 329, 333, 353

See application file for complete search history.

(56) References Cited

U.S. PATENT DOCUMENTS

| 4,330,304 | A | * | 5/1982 | Gorman ......................... 44/322 |
| 4,398,505 | A | * | 8/1983 | Cahill ........................... 123/1 A |
| 4,463,734 | A | | 8/1984 | Akeroyd ....................... 123/525 |
| 4,541,835 | A | * | 9/1985 | Norton et al. ................. 44/326 |
| 6,676,715 | B1 | * | 1/2004 | Henry et al. ................... 44/329 |
| 2002/0139044 | A1 | | 10/2002 | Berlin et al. .................. 44/639 |

FOREIGN PATENT DOCUMENTS

| EP | 1 057 988 A2 | 12/2000 |
| GB | 1 593 852 | 7/1981 |
| JP | 2000-213444 | 8/2000 |
| JP | 2001-355471 | 12/2001 |
| WO | WO 01/32809 A1 | 5/2001 |

\* cited by examiner

*Primary Examiner*—Tony M. Argenbright
(74) *Attorney, Agent, or Firm*—Arent Fox, PLLC.

(57) ABSTRACT

The invention provides a method for controlling a compression ignition internal combustion engine, which can easily deal with a wide range of demand loads with a single fuel. The compression ignition internal combustion engine includes a fuel containing an ignition improver, and as the demand load increases, part of the ignition improver contained in the fuel is changed into a material having a reduced ignitability improvement capability, and the fuel having reduced ignitability is supplied to the compression ignition internal combustion engine. A fuel having part of the ignition improver changed into a material having a reduced ignitability improvement capability, and thus having reduced ignitability, and a fuel with the ignitability improvement capability of the ignition improver maintained are mixed together in any ratio, and supplied to the compression ignition internal combustion engine.

12 Claims, 2 Drawing Sheets

METHOD FOR CONTROLLING COMPRESSION IGNITION INTERNAL COMBUSTION ENGINE

BACKGROUND OF THE INVENTION

1. Field of the Invention

The present invention relates to a method for controlling a compression ignition internal combustion engine.

2. Description of the Related Art

In recent years, for reducing a fuel consumption per predetermined load or per predetermined time in an internal combustion engine, a compression ignition internal combustion engine represented by a premix compression ignition internal combustion engine has been under consideration. For the compression ignition internal combustion engine, however, it is difficult to control timing of ignition unlike a spark ignition internal combustion engine. Furthermore, the compression ignition internal combustion engine has a problem such that knocking easily occurs when a demand load of the engine increases if a fuel of high ignitability is used, while misfire easily occurs when the demand load decreases if a fuel of low ignitability is used, thus narrowing the operation range.

For solving the problem, a technique has been known in which a fuel of high ignitability and a fuel of low ignitability are provided, and both the fuels are mixed and supplied to the engine (e.g. see Japanese Patent Laid-Open No. 2001-355471). According to the technique, the mixing ratio of the fuels is adjusted in accordance with the demand load of the compression ignition internal combustion engine, whereby the engine can be stably operated for a wide range of demand loads. In the technique, however, the fuel of high ignitability and the fuel of low ignitability are separately stored, and therefore a plurality of tanks are required.

On the other hand, a technique is also known in which a single fuel is used, and part of the fuel is partially oxidized to produce an ignitability controlling material when the demand load of the compression ignition internal combustion engine increases (e.g. see Japanese Patent Laid-Open No. 2000-213444). Specifically, the technique is such that part of a hydrocarbon based fuel such as light oil is partially oxidized to produce an ignitability controlling material such as formaldehyde, and has an advantage that only one fuel tank is required.

However, the technique has a disadvantage that a high-temperature and long-time reaction is required for partially oxidizing the hydrocarbon such as light oil to produce formaldehyde.

SUMMARY OF THE INVENTION

The object of the present invention is to eliminate such problems and provide a method for controlling a compression ignition internal combustion engine, which can easily cope with a wide range of demand loads with a single fuel.

For achieving such an object, the present invention is a method for controlling a compression ignition internal combustion engine in which a gas containing oxygen and a fuel capable of being self-ignited under compression are introduced into a cylinder, and compressed to be self-ignited, wherein the compression ignition internal combustion engine comprises a fuel containing an ignition improver, and as a demand load of the compression ignition internal combustion engine increases, at least part of the ignition improver contained in the fuel is changed into a material having a reduced ignitability improvement capability to reduce ignitability of the fuel, and the fuel having reduced ignitability is supplied to the compression ignition internal combustion engine.

In the method of the present invention, the fuel contains the ignition improver and therefore has high ignitability, and even when the demand load of the compression ignition internal combustion engine decreases, the compression ignition internal combustion engine can be stably operated without causing misfire or the like.

In the method of the present invention, when the demand load of the compression ignition internal combustion engine increases, at least part of the ignition improver is decomposed or made to react with components of the fuel to change the same into a material having a reduced ignitability improvement capability. The ignition improver can be changed into a material having a reduced ignitability improvement capability at ordinary temperature in a short time without necessity to heat the ignition improver to a high temperature as in partial oxidization of hydrocarbon and the like.

If at least part of the ignition improver is changed into a material having a reduced ignitability improvement capability, then the fuel has relatively reduced ignitability compared to the ignitability when the fuel contains the ignition improver. The fuel having at least part of the ignition improver changed into a material having a reduced ignitability improvement capability, and thus having reduced ignitability is supplied to the compression ignition internal combustion engine, whereby the compression ignition internal combustion engine can be stably operated without causing knocking or the like even if the demand load of the compression ignition internal combustion engine is high.

The fuels capable of being self-ignited under compression may include, for example, hydrocarbon based fuels such as existing fuels such as light oil, kerosene and gasoline, and synthetic fuels such as di-methyl ether and heptane. Particularly, the heptane is contained in a naphtha fraction obtained through a natural gas liquefaction (GTL: gas to liquid) process, is easily synthesized because of the low boiling point, and is thus suitable as a fuel for the compression ignition internal combustion engine. The heptane may contain acetophenone, toluene and the like.

The ignition improvers for the fuel may include at least one type of compound selected from the group consisting of organic peroxides, nitrates, nitrites, nitro compounds and azo compounds because they are easily decomposed at ordinary temperature in a short time. The organic peroxides may include, for example, cumene hydroperoxide. The nitrates may include, for example, n-pentyl nitrate. The nitrites may include, for example, n-pentyl nitrite.

In the method of the present invention, at least part of the fuel is made to contact a catalyst, by which the ignition improver contained in the fuel is changed into a material having a reduced ignitability improvement capability. As the catalyst, at least one type of material selected from the group consisting of single metals, metal compounds, solid acid catalysts and solid base catalysts is preferably used because they can easily change the ignition improver as described above.

The metal compounds may include, for example, iron chloride (III). The solid acid catalysts may include at least one type of material selected from the group consisting of zirconia sulfate, zeolite, dodeca-tungsto (VI) phosphoric acid hydrate, acid clay and montmorillonite.

In the method of the present invention, the catalyst is preferably carried on a porous carrier. The catalyst is carried on the porous carrier, whereby the ignition improver contained in the fuel can be changed into a material having a reduced ignitability improvement capability in a short time when at least part of the fuel is made to contact the catalyst. The catalyst is carried on the porous carrier, whereby the amount of catalyst required for changing the ignition improver into a material having a reduced ignitability improvement capability can be reduced.

The porous carriers may include, for example, spherical silica.

In the method of the present invention, the fuel having at least part of the ignition improver changed into a material having a reduced ignitability improvement capability, and thus having reduced ignitability may be supplied directly to the compression ignition internal combustion engine, but a fuel having at least part of the ignition improver changed into a material having a reduced ignitability improvement capability, and thus having reduced ignitability, and a fuel with the ignitability improvement capability of the ignition improver maintained may be mixed together in any ratio, and supplied to the compression ignition internal combustion engine.

DETAILED DESCRIPTION OF THE PREFERRED EMBODIMENTS

Embodiments of the present invention will now be described further in detail with reference to the accompanying drawings.

Figure 1:
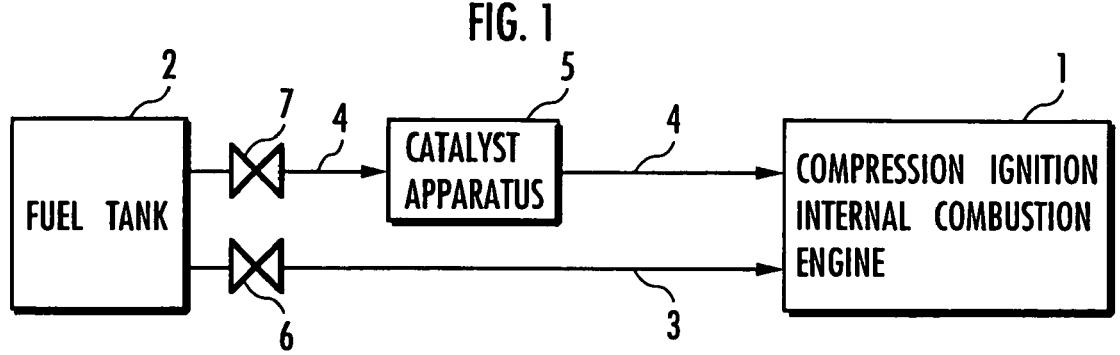
FIG. 1 is a block diagram showing one embodiment of a method for controlling a compression ignition internal combustion engine in the present invention.

A control method of this embodiment can be carried out by a compression ignition internal combustion engine 1 shown in FIG. 1. The compression ignition internal combustion engine 1 comprises a fuel tank 2 storing a fuel containing an ignition improver. The fuel tank 2 is connected to the compression ignition internal combustion engine 1 via supply pipes 3 and 4. The supply pipe 3 is connected to the compression ignition internal combustion engine 1. The supply pipe 4 is provided at some midpoint therein with a catalyst apparatus 5 storing a catalyst for decomposing the ignition improver. The supply pipe 3 is provided with a flow regulating valve 6 on the fuel tank 2 side. A flow regulating valve 7 is provided between the fuel tank 2 and the catalyst apparatus 5 in the supply pipe 4.

Fuels stored in the fuel tank 2 may include, for example, hydrocarbons such as heptane ($C_7H_{16}$). The fuel may have acetophenone, toluene or the like added to heptane.

The ignition improvers contained in the fuel may include at least one type of compound selected from the group consisting of organic peroxides, nitrates, nitro compounds and azo compounds.

For the ignition improver, the organic peroxides are particularly suitable in terms of easy decomposition. The organic oxides may include, for example, alkyl hydroperoxides such as cumene hydroperoxide, ketone peroxides, dialkyl peroxides, diacyl peroxides, alkyl peresters and percarbonates.

For the ignition improver, nitrates such as n-pentyl nitrate or nitrites such as n-pentyl nitrite are particularly suitable in terms of production of a material having a reduced ignitability improvement capability.

Catalysts stored in the catalyst apparatus 5 may include at least one type of material selected from the group consisting of single metals, metal compounds, solid acid catalysts and solid base catalysts.

The single metals may include metals such as iron, copper, nickel, cobalt and manganese. The metal compounds may include various kinds of metal compounds such as iron chloride (III).

The solid acid catalysts may include metal oxides, metal salts, metal oxide carrying acids and ion exchange resins. Specifically, the solid acid catalysts may include at least one type of material selected from the group consisting of zirconia sulfate, zeolite, dodeca-tungsto (VI) phosphoric acid hydrate, acid clay and montmorillonite.

The solid base catalysts may include alkali earth metals, alkali earth metal hydroxides, carriage alkali metals, carriage alkali hydroxides and anion exchange resins.

In the control method of this embodiment, first, the flow regulating valve 7 is closed and only the flow regulating valve 6 is opened to supply the fuel contained in the fuel tank 1 directly to the compression ignition internal combustion engine 1 through the supply pipe 3 when a demand load of the compression ignition internal combustion engine 1 is low. At this time, the fuel contains the ignition improver, and therefore has improved ignitability. Thus, the compression ignition internal combustion engine 1 can be stably operated with the fuel without causing misfire or the like.

Then, when the demand load of the compression ignition internal combustion engine 1 is high, the flow regulating valve 7 is opened at a predetermined rate according to level of the demand load. At least part of the fuel stored in the fuel tank 1 is supplied to the catalyst apparatus 5, made to contact the catalyst in the catalyst apparatus 5, and then supplied to the compression ignition internal combustion engine 1.

The fuel contacts the catalyst in the catalyst apparatus 5, whereby the ignition improver is decomposed, or reacts with components of the fuel to be changed into a material having a reduced ignitability improvement capability. Thus, the fuel with the ignition improver decomposed has reduced ignitability compared with the fuel containing the ignition improver.

As a result, the fuel containing the ignition improver and thus having improved ignitability is supplied to the compression ignition internal combustion engine 1 through the supply pipe 3, and the fuel having the ignition improver changed into a material having a reduced ignitability improvement capability, and thus having reduced ignitability is supplied through the supply pipe 4. The openings of the flow regulating valves 6 and 7 are adjusted to adjust the ratio between the fuel having improved ignitability and the fuel having reduced ignitability as appropriate, whereby ignitability of the fuel supplied to the compression ignitability internal combustion engine 1 can be reduced according to the level of the demand load of the compression ignition internal combustion engine 1. Thus, the compression ignition internal combustion engine 1 can be stably operated without causing knocking even when the demand load is high.

Figure 2:
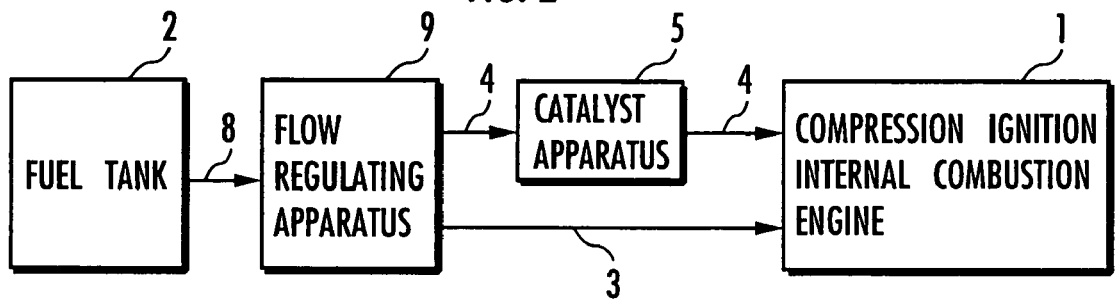
FIGS. 2 to 4 are block diagrams each showing another embodiment of the method for controlling a compression ignition internal combustion engine in the present invention.

In the compression ignition internal combustion engine 1 of FIG. 1, the flow regulating valves 6 and 7 are provided in the supply pipes 3 and 4, respectively, to adjust the ratio between the fuel having improved ignitability and the fuel having reduced ignitability. However, as shown in FIG. 2, a flow regulating apparatus 9 connected through a main supply pipe 8 to the fuel tank 2 may be provided between the fuel tank 2 and the catalyst apparatus 5. In this case, the supply pipes 3 and 4 are branched from the flow regulating apparatus 9. According to the compression ignition internal combustion engine 1 shown in FIG. 2, the supply pipes 3 and 4 comprise no flow regulating valves 6 and 7, but the fuel having improved ignitability and the fuel having reduced ignitability is adjusted by the flow regulating apparatus 9.

Figure 3:
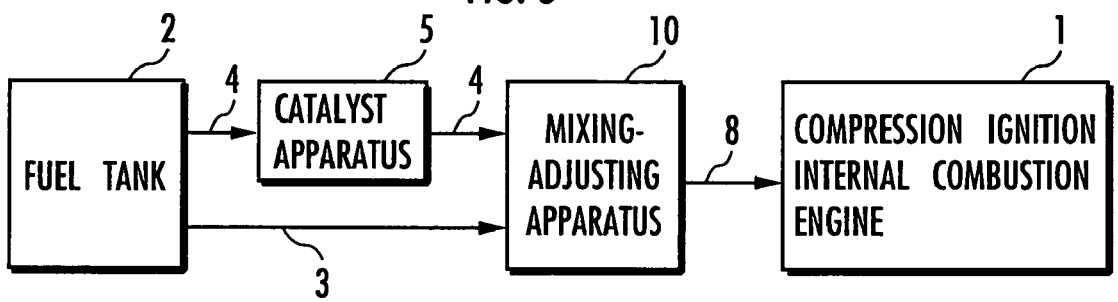

As shown in FIG. 3, a mixing-adjusting apparatus 10 may be provided between the catalyst apparatus 5 and the compression ignition internal combustion engine 1. The supply pipes 3 and 4 are connected to the mixing-adjusting apparatus 10. The mixing-adjusting apparatus 10 is connected through the main supply pipe 8 to the compression ignition internal combustion engine 1.

According to the compression ignition internal combustion engine 1 shown in FIG. 3, the supply pipes 3 and 4 comprise no flow regulating valves 6 and 7. However, the fuel having improved ignitability and the fuel having reduced ignitability are mixed together in a predetermined ratio by the mixing-adjusting apparatus 10, and supplied to the compression ignition internal combustion engine 1.

Figure 4:
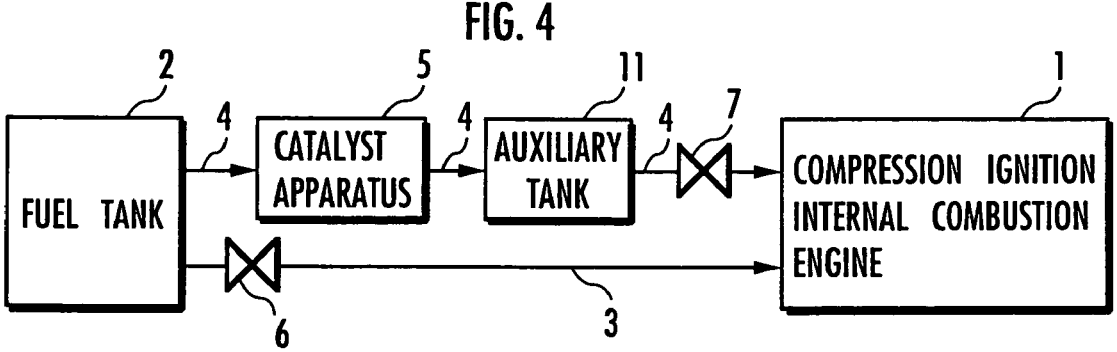

As shown in FIG. 4, an auxiliary tank 11 may be provided between the catalyst apparatus 5 and the compression ignition internal combustion engine 1 in the supply pipe 4. The auxiliary tank 11 stores the fuel having reduced ignitability. In this case, the flow regulating valve 7 is provided between the auxiliary tank 11 and the compression ignition internal combustion engine 1.

According to the compression ignition internal combustion engine 1 shown in FIG. 4, the fuel having reduced ignitability is previously stored in the auxiliary tank 11, and supplied to the compression ignition internal combustion engine 1 via the flow regulating valve 7. Thus, when the demand load of the compression ignition internal combustion engine 1 increases, one can swiftly deal with this situation. Adjustment of the ratio between the fuel having improved ignitability and the fuel having reduced ignitability is performed by adjusting the openings of the flow regulating valves 6 and 7.

In the control method of this embodiment, for example, a fuel with heptane as a main fuel containing 0.01 to 6.0 wt % of cumene hydroperoxide as an ignition improver expressed by the following formula (1) may be used as a fuel stored in the fuel tank 2. For the heptane, an effect of improving ignitability cannot be obtained if the content of the cumene hydroperoxide is less than 0.01 wt %. If the content of the cumene hydroperoxide in the heptane is greater than 6.0 wt %, a polymer based precipitate is produced, and thus the heptane is no longer suitable as a fuel.

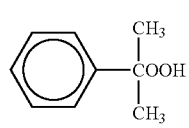

(1)

If contacting the catalyst, the cumene hydroperoxide as an ignition improver is decomposed into phenol and acetone as shown in the following formula (2). The phenol acts as an ignition inhibiting agent, and therefore ignitability of the fuel with cumene hydroperoxide decomposed can be advantageously reduced to a level lower than that of pure heptane.

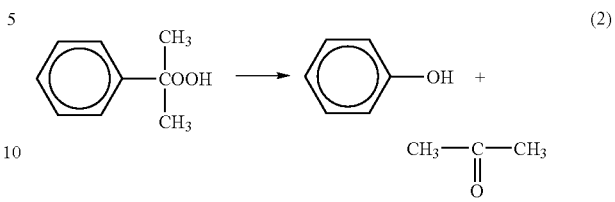

(2)

Then, for the fuel with heptane as a main fuel containing cumene hydroperoxide as an ignition improver in a predetermined ratio, ignitability where cumene hydroperoxide was not decomposed (fuel A) was compared with ignitability where cumene hydroperoxide was decomposed (fuel B). The fuel B with cumene hydroperoxide decomposed was prepared by making the fuel A with cumene hydroperoxide not decomposed pass through the catalyst apparatus 5 at a flow rate of 100 ml/minute at room temperature, and contact a catalyst. For the catalyst apparatus 5, a stainless container having an inner diameter of 30 mm, a length of 100 mm and a wall thickness of 2 mm, filled with iron chloride (III) with the average diameter of 100 μm as a catalyst, was used.

The fuels of A and B were sprayed into a high-pressure container with the volume of 650 ml containing air at 450° C. and 20 atmospheric pressures, time until pressure increased was measured as ignition delay time, and the ignitability was compared by the ignition delay time. As the ignition delay time decreases, the ignitability is improved. The results are shown in Table 1.

TABLE 1

| | Comparison of ignitability | |
|---|---|---|
| Content of cumene hydroperoxide (wt %) | Ignition delay time of fuel A (msec) | Ignition delay time of fuel B (msec) |
| less than 0.01 | No difference in ignition delay time | |
| 0.01 | 7.20 | 7.35 |
| 0.1 | 6.80 | 7.40 |
| 1.7 | 6.20 | 7.69 |
| 6.0 | 4.93 | 8.40 |
| greater than 6.0 | Polymer based precipitate produced | |

From Table 1, it is apparent that for the heptane as a main fuel, an effect of improving ignitability can be obtained by containing 0.01 to 6.0 wt % of cumene hydroperoxide as an ignition improver. Furthermore, it is apparent that for the heptane as a main fuel, the ignition delay time decreases to improve ignitability as the content of cumene hydroperoxide as an ignition improver increases within the aforesaid range. On the other hand, it is apparent that for the heptane as a main fuel, the ignition delay time increases to reduce ignitability as the content of cumene hydroperoxide increases within the aforesaid range, when the cumene hydroperoxide is decomposed.

Then, a fuel comprised of 99 wt % of heptane as a main fuel and 1 wt % of cumene hydroperoxide (80 wt % isopropyl benzene solution) as an ignition improver was made to pass through the catalyst apparatus 5 and contact a catalyst, and then sprayed into a high-pressure container with the volume of 650 ml containing air at 450° C. and 20 atmospheric pressures. The decomposition rate of cumene hydroperoxide and ignition delay time with various kinds of solid acid catalysts used was compared with those with no catalyst used.

For the catalyst apparatus 5, a stainless container having an inner diameter of 30 mm, a length of 10 mm and a wall thickness of 2 mm, filled with various kinds of catalysts, was used. As the solid acid catalysts, zirconia sulfate with the particle size of 10 μm, dodeca-tungsto (VI) phosphoric acid hydrate with the particle size of 10 μm, zeolite with the particle size of 1.6 mm, acid clay with the particle size of 50 μm, and montmorillonite with the particle size of 50 μm were used respectively. The fuel was made to pass at room temperature at a flow rate of 100 ml/minute with respect to the catalyst apparatus 5. The results are shown in Table 2.

TABLE 2

|  | Decomposition rate of cumene hydroperoxide (%) | Ignition delay time (msec) |
|---|---|---|
| Zirconia sulfate | 100 | 7.53 |
| Dodeca-tungsto (VI) phosphoric acid hydrate | 100 | 7.65 |
| Zeolite | 18 | 6.65 |
| Acid clay | 8 | 6.53 |
| Montmorillonite | 47 | 7.03 |
| No catalyst | 0 | 6.40 |

From Table 2, it is apparent that cumene hydroperoxide can be decomposed by any of the solid acid catalysts, and ignition delay time can be increased compared with ignition delay time with no catalyst used.

In the control method of this embodiment, a fuel with, for example, 1 wt % of n-pentyl nitrate ($C_5H_{11}$—$NO_2$) as an ignition improver contained in a main fuel comprised of, for example, 70 wt % of heptane and 30 wt % of toluene may be used as a fuel stored in the fuel tank 2.

When contacting the catalyst, the n-pentyl nitrate as an ignition improver reacts with toluene as a component of the main fuel to produce pentyl alcohol ($C_5H_{11}OH$) being a material having a reduced ignitability improvement capability as shown in the following formula (3).

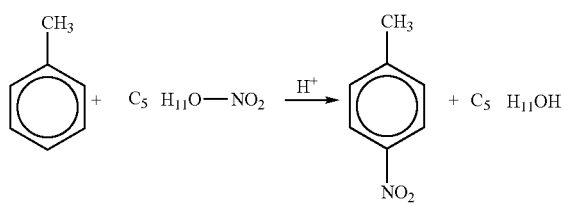

(3)

Then, for the fuel with 1 wt % of n-pentyl nitrate as an ignition improver contained in the main fuel comprised of 70 wt % of heptane and 30 wt % of toluene, ignitability where n-pentyl nitrate did not react with toluene as a component of the main fuel (fuel C) was compared with ignitability where n-pentyl nitrate reacted with toluene (fuel D). The fuel D with n-pentyl nitrate reacting with toluene was prepared by making the fuel C with n-pentyl nitrate not react with toluene pass through the catalyst apparatus 5 at a flow rate of 100 ml/minute at 50° C. and contact the catalyst. For the catalyst apparatus 5, a stainless container having an inner diameter of 30 mm, a length of 100 mm and a wall thickness of 2 mm and comprising a heater, filled with dodeca-tungsto (VI) phosphoric acid hydrate with the average particle size of 10 μm as a catalyst, was used.

The fuels of C and D were sprayed into a high-pressure container with the volume of 650 ml containing air at 450° C. and 20 atmospheric pressures, time until pressure increased was measured as ignition delay time, and the ignitability was compared by the ignition delay time. As the ignition delay time decreases, the ignitability is improved. The results are shown in Table 3.

TABLE 3

|  | Ignition delay time (msec) |
|---|---|
| Fuel C | 5.68 |
| Fuel D | 6.82 |

From Table 3, it is apparent that for the main fuel, the ignition delay time increases to reduce ignitability by reaction of the n-pentyl nitrate as an ignition improver with toluene as a component of the main fuel.

In the control method of this embodiment, a fuel with, for example, 1 wt % of n-pentyl nitrite ($C_5H_{11}O$—NO) as an ignition improver contained in a main fuel comprised of, for example, 90 wt % of heptane and 10 wt % of acetophenone may be used as a fuel stored in the fuel tank 2.

When contacting the catalyst, the n-pentyl nitrite as an ignition improver reacts with acetophenone as a component of the main fuel to produce pentyl alcohol being a material having a reduced ignitability improvement capability as shown in the following formula (4).

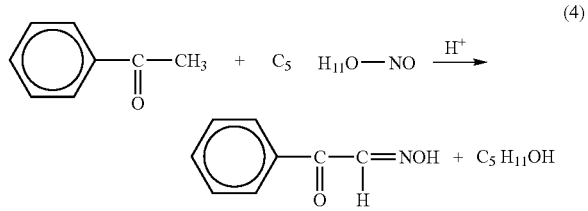

(4)

Then, for the fuel with 1 wt % of n-pentyl nitrite as an ignition improver contained in the main fuel comprised of 90 wt % of heptane and 10 wt % of acetophenone, ignitability where the ignition improver did not react with acetophenone as a component of the main fuel (fuel E) was compared with ignitability where n-pentyl nitrite reacted with acetophenone (fuel F). The fuel F with n-pentyl nitrite reacting with acetophenone was prepared by making the fuel E with n-pentyl nitrite not reacting with acetophenone pass through the catalyst apparatus 5 at a flow rate of 100 ml/minute at room temperature and contact the catalyst. For the catalyst apparatus 5, a stainless container having an inner diameter of 30 mm, a length of 100 mm and a wall thickness of 2 mm and comprising a heater, filled with zirconia sulfate with the average particle size of 10 μm as a catalyst, was used.

The fuels of E and F were sprayed into a high-pressure container with the volume of 650 ml containing air at 450° C. and 20 atmospheric pressures, time until pressure increased was measured as ignition delay time, and the ignitability was compared by the ignition delay time. As the ignition delay time decreases, the ignitability is improved.

The results are shown in Table 4.

TABLE 4

|  | Ignition delay time (msec) |
| --- | --- |
| Fuel E | 4.16 |
| Fuel F | 4.36 |

From Table 4, it is apparent that for the main fuel, the ignition delay time increases to reduce ignitability by reaction of the n-pentyl nitrite as an ignition improver with acetophenone as a component of the main fuel.

In the control method of this embodiment, the above described catalyst carried on a porous carrier may be used as a catalyst stored in the catalyst apparatus 5. Such catalysts may include, for example, dodeca-tungsto (VI) phosphoric acid hydrate carried on spherical silica.

By using the catalyst in a state in which the catalyst is carried on the porous carrier such as spherical silica, the ignition improver such as cumene hydroperoxide can be decomposed in a short time, and also the amount of catalyst required for decomposition of the ignition improver can be reduced.

Then, for a fuel comprised of 99 wt % of heptane and 1 wt % of solution having 80 wt % of cumene hydroperoxide diluted with isopropyl benzene, variations with time of components of the fuel when the fuel was made to contact dodeca-tungsto (VI) phosphoric acid hydrate carried on spherical silica were examined.

The fuel was made to contact the dodeca-tungsto (VI) phosphoric acid hydrate carried on spherical silica by putting 100 g of the fuel in a 500 ml flat bottom flask, keeping the liquid temperature at 50° C. while stirring in a temperature controlled bath with a stirrer, and putting in the flask a catalyst with dodeca-tungsto (VI) phosphoric acid hydrate carried on spherical silica in imitation of a situation in which a fuel supplied from the fuel tank 2 is made to contact a catalyst in the catalyst apparatus 5.

The catalyst was prepared in the following manner. First, an aqueous solution of 12.8 g of dodeca-tungsto (VI) phosphoric acid hydrate in 30 ml of water was sprayed to 30 g of spherical silica. Then, the aqueous solution and the spherical silica were uniformly mixed together, then left standing at room temperature all night through, and kept in a temperature controlled bath at 120° C. for 3 hours to evaporate water. The mixture was cooled to room temperature in a vacuum desiccator, and then kept at 400° C. for 1 hour to be baked using a muffle furnace, whereby a catalyst with dodeca-tungsto (VI) phosphoric acid hydrate carried on spherical silica.

For the spherical silica, a product made by Fuji Silysia Chemical Ltd. and having a specific surface area of 323 $m^2/g$, a pore volume of 1.03 ml/g, and a bulk density of 0.43 g/ml. The spherical silica has a particle size distribution with 0.2% of particles having sizes less than 0.85 mm, 93.6% of particles having sizes of 0.85 to 1.70 mm, and 6.2% of particles having sizes greater than 1.7 mm.

The prepared catalyst carried 29 wt % of dodeca-tungsto (VI) phosphoric acid hydrate based on the total amount including that of the spherical silica. The specific surface area of the prepared catalyst was 225 $m^2/g$ as measured by Flow Sorb II 2300 (trade name) manufactured by Shimadzu Corporation using the BET method.

Then, the amount of the catalyst was 3.3 g (the amount of dodeca-tungsto (VI) phosphoric acid hydrate carried on the catalyst was 1 g), and when the fuel kept at a liquid temperature of 50° C. was made to contact the catalyst, about 2 g of each reaction solution was taken before the reaction (reaction time: 0) and 5, 15, 30, 90, 90 and 120 minutes after the start of the reaction (reaction time: 5, 15, 30, 90, 90 and 120 minutes, respectively), and the variation with time in fuel composition was examined. For the composition of the fuel, filtrate obtained by filtering the catalyst from each taken reaction solution was neutralized with sodium hydrogen carbonate, triphenylphosphine was added to reduce cumene hydroperoxide in the filtrate into cumyl alcohol, and then the filtrate was analyzed by GC/MS (gas chromatography-mass spectrometry). The analysis was performed by previously adding triphenylphosphine to the fuel to reduce cumene hydroperoxide in the fuel into cumyl alcohol, then analyzing the fuel by GC/MS to determine peak areas of cumyl alcohol and isopropyl benzene, and determining the ratio of the peak area of the cumyl alcohol to the peak area of each component in the fuel. The results are shown in FIG. 5.

Figure 5:
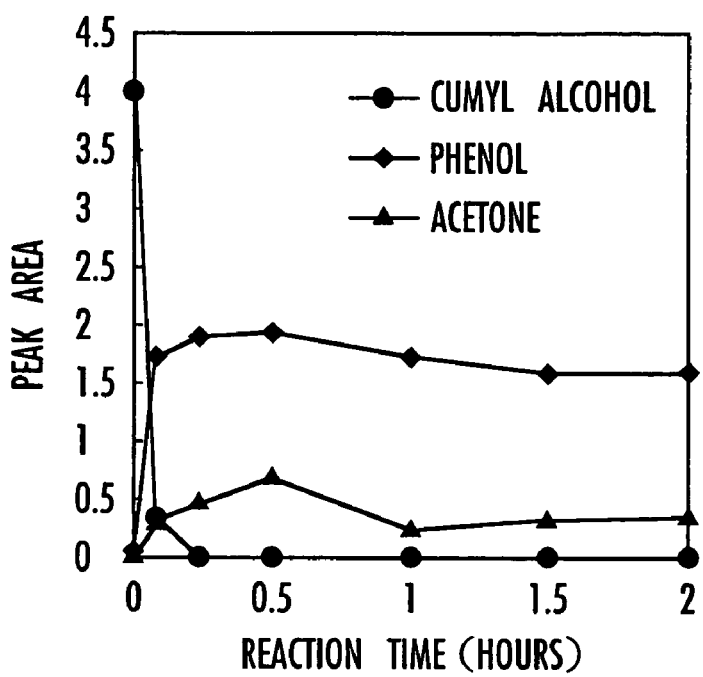
FIGS. 5 and 6 are graphs each showing a variation with time in fuel composition when a fuel containing cumene hydroperoxide is made to contact a catalyst carried on a porous carrier.

From FIG. 5, it is apparent that at the reaction time of 15 minutes, the amount of cumyl alcohol rapidly decreases to 0, while the amounts of phenol and acetone being decomposition products of cumene hydroperoxide increase and are held almost constant. Thus, it is apparent that cumene hydroperoxide in the fuel is all decomposed at the reaction time of 15 minutes.

Then, for the fuel comprised of 99 wt % of heptane as a main fuel and 1 wt % of cumene hydroperoxide (80 wt % isopropyl benzene solution) as an ignition improver, ignitability where the fuel was not made to contact the catalyst (fuel G) was compared with ignitability where the fuel was kept at a liquid temperature of 50° C. and made to contact the catalyst for 120 minutes (fuel I).

The fuels of G and I were sprayed into a high-pressure container with the volume of 650 ml containing air at 450° C. and 20 atmospheric pressures, time until pressure increased was measured as ignition delay time, and the ignitability was compared by the ignition delay time. As the ignition delay time decreases, the ignitability is improved. The results are shown in Table 5.

TABLE 5

|  | Ignition delay time (msec) |
| --- | --- |
| Fuel G | 6.07 |
| Fuel I | 7.65 |

From Table 5, it is apparent that for the main fuel, the ignition delay time increases to reduce ignitability by making the main fuel contact the catalyst.

100 g of the fuel was put in a 500 ml flat bottom flask, the liquid temperature was kept at 50° C. while stirring in a temperature controlled bath with a stirrer, and the fuel was made to contact 1 g of dodeca-tungsto (VI) phosphoric acid hydrate that was not carried on spherical silica. As a result, two hours were required until cumene hydroperoxide in the fuel was all decomposed.

Thus, it is apparent that by using dodeca-tungsto (VI) phosphoric acid hydrate carried on spherical silica, time required for decomposition of cumene hydroperoxide in the fuel can be significantly reduced.

Then, the variation in fuel composition was examined in just the same manner as in FIG. 5 except that the amount of the catalyst was 1.0 g (0.3 g of dodeca-tungsto (VI) phosphoric acid hydrate was carried on the catalyst). The results are shown in FIG. 6.

Figure 6:
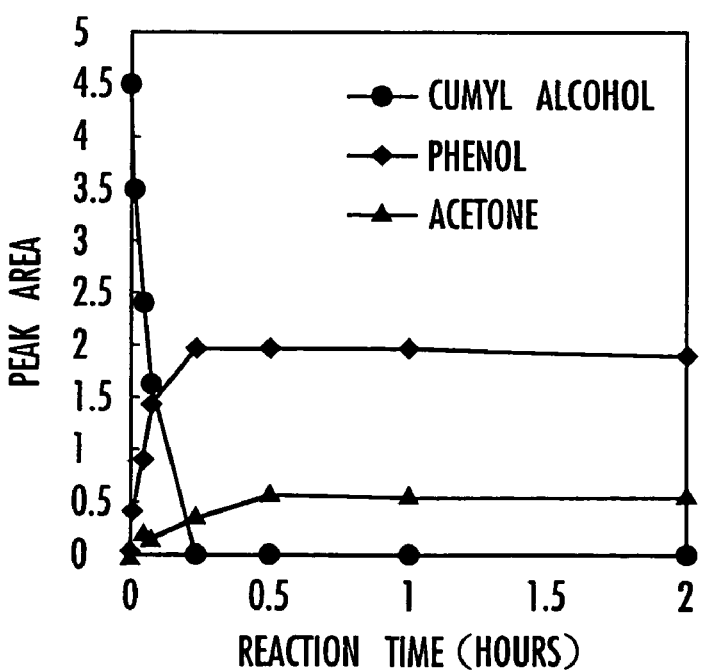

From FIG. 6, it is apparent that at the reaction time of 15 minutes, the amount of cumyl alcohol rapidly decreases to 0, while the amounts of phenol and acetone being decomposition products of cumene hydroperoxide increase and are held almost constant. Thus, it is apparent that even if the amount of the catalyst is 1.0 g, almost same results as those obtained when the amount of the catalyst is 3.3 g can be obtained, and cumene hydroperoxide in the fuel is all decomposed at the reaction time of 15 minutes.

From the results shown in FIGS. 5 and 6, it is apparent that by carrying dodeca-tungsto (VI) phosphoric acid hydrate on spherical silica being a porous carrier, the amount thereof required for decomposition of cumene hydroperoxide can be reduced.

What is claimed is:

1. A method of controlling a compression ignition internal combustion engine in which a gas containing oxygen and a fuel capable of being self-ignited under compression are introduced into a cylinder, and compressed to be self-ignited,
    wherein the compression ignition internal combustion engine comprises a fuel containing an ignition improver;
    and as a demand load of the compression ignition internal combustion engine increases, at least part of the ignition improver contained in the fuel is changed into a material having a reduced ignitability improvement capability to reduce ignitability of the fuel, and the fuel having reduced ignitability is supplied to the compression ignition internal combustion engine.

2. The method according to claim 1, wherein a fuel containing at least one type of compound selected from the group consisting of organic peroxides, nitrates, nitrites, nitro compounds and azo compounds is used as said ignition improver.

3. The method according to claim 2, wherein said organic peroxide is cumene hydroperoxide.

4. The method according to claim 2, wherein said nitrate is n-pentyl nitrate.

5. The method according to claim 2, wherein said nitrite is n-pentyl nitrite.

6. The method according to claim 1, wherein at least part of said fuel is made to contact a catalyst, and said ignition improver contained in the fuel is changed into a material having a reduced ignitability improvement capability by the catalyst.

7. The method according to claim 6, wherein at least one type of material selected from the group consisting of single metals, metal compounds, solid acid catalysts and solid base catalysts is used as said catalyst.

8. The method according to claim 7, wherein said metal compound is iron chloride (III).

9. The method according to claim 7, wherein said solid acid catalyst is at least one type selected from the group consisting of zirconia sulfate, zeolite, dodeca-tungsto (VI) phosphoric acid hydrate, acid clay and montmorillonite.

10. The method according to claim 6, said catalyst is carried on a porous carrier.

11. The method according to claim 10, wherein said porous carrier is spherical silica.

12. The method according to claim 1, wherein a fuel having at least part of said ignition improver changed into a material having a reduced ignitability improvement capability, and thus having reduced ignitability, and a fuel with the ignitability improvement capability of the ignition improver maintained are mixed together in any ratio, and supplied to said compression ignition internal combustion engine.

* * * * *